Patented Aug. 15, 1950

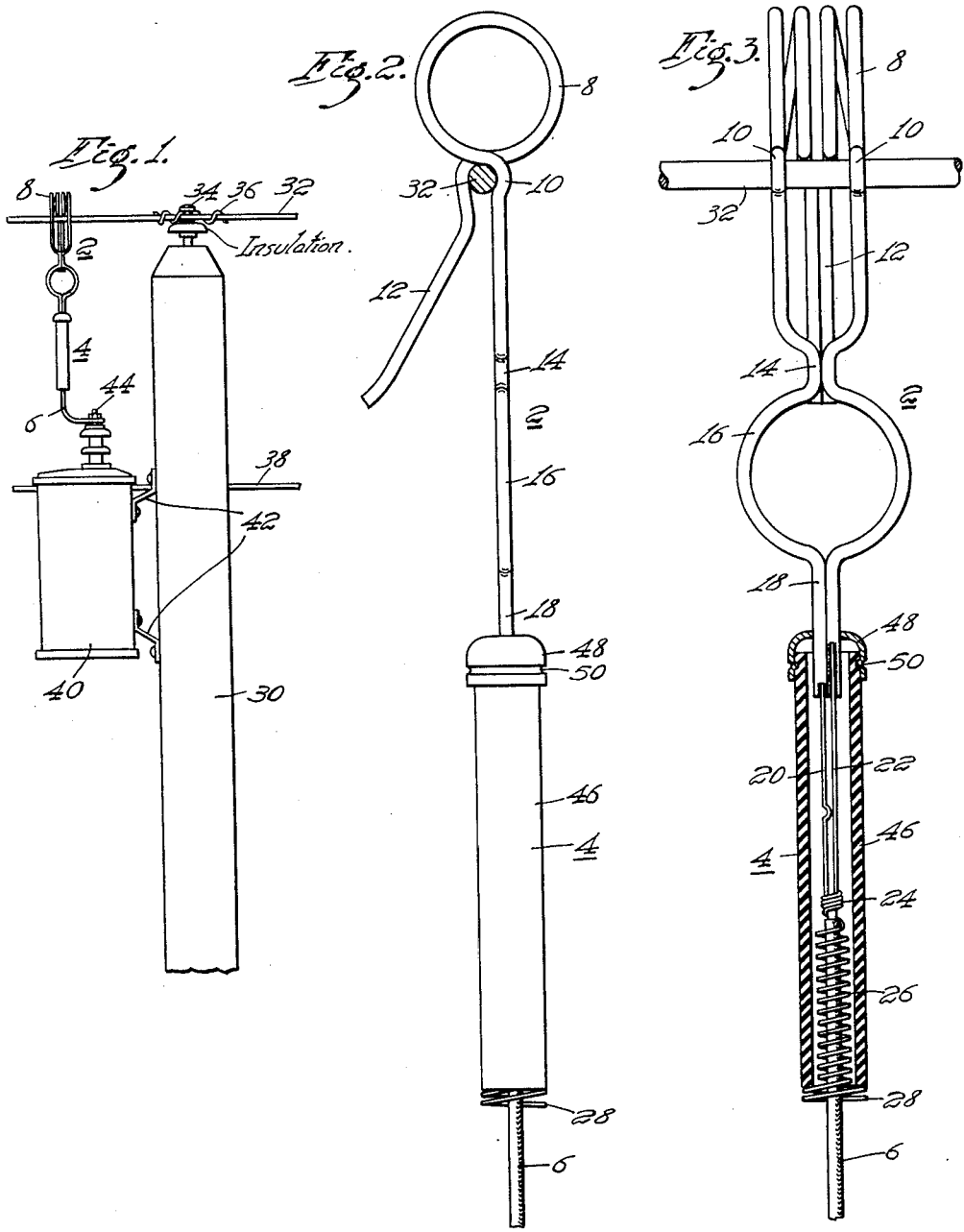

2,519,300

UNITED STATES PATENT OFFICE 2,519,300

CIRCUIT INTERRUPTER

James M. Wallace, Braddock, Pa., assignor to Westinghouse Electric Corporation, East Pittsburgh, Pa., a corporation of Pennsylvania Application June 25, 1945, Serial No. 601,389

3 Claims. (Cl. 200—115.5)

1

This invention relates to electric circuit interrupters in general, and especially to high-voltage fuses.

In order to economically furnish proper high-voltage fuse protection for distribution transformers on rural lines, it is necessary that the cost of such protection be extremely low, and consequently that the fuse structure be relatively simply constructed of few parts, and be capable of easy installation.

One object of this invention, therefore, is to provide a novel simplified form of high-voltage fuse.

Another object of this invention is to provide a novel replaceable fuse unit which includes as a part thereof means for readily connecting the unit to a line and apparatus terminal.

These and other objects of this invention will become more apparent upon consideration of the following description of a preferred embodiment thereof, when taken in connection with the attached drawing, in which:

Figure 1 is an elevational view of a transformer pole installation employing a fuse constructed in accordance with this invention;

Fig. 2 is an enlarged elevation view of the fuse shown in Fig. 1, but looking in a direction substantially at right angles to Fig. 1; and Fig. 3 is an enlarged elevation view of the fuse shown in Fig. 1 with a part thereof in section.

The fuse comprising this invention may be regarded as including three main parts, a clamp portion 2, fuse portion 4 and tail 6. Clamp portion 2 is illustrated as being formed of two wires of resilient material, such as copper alloy or the like, but it will be obvious that, if desired, it may be formed of a single such wire. The two wires forming clamp portion 2 are separated adjacent one end and coiled inwardly towards each other to form a spring hook-eye portion 8, and these ends of the wires are then crossed and separated slightly to form a clamp portion 10 for receiving a line conductor 32, with the wires then being brought together and bent outwardly as at 12, to provide a flared entrance to clamp portion 10. At the other side of hook-eye portion 8, the wires are brought together as at 14 to form a stop against which ends 12 of the wires may abut when the clamp is not positioned on a conductor 32. Beyond stop portion 14, the wires are again separated and each curved in the form of a semicircle and again brought together as at 18, thus forming another hook-eye portion 16 adjacent the other ends of the wires.

The portions 18 of the wires form a terminal to which one end of a fusible wire 20 may be attached, as for example, by soldering or the like. Fusible wire 20 may be of any well known fusible material or alloys of such materials. A strain wire 22 of a material having a higher resistance than fusible wire 20 is also adapted to be attached to terminal portion 18 of the clamp, as by soldering or the like, with the other ends of fusible wire 20 and strain wire 22 being hooked over the small end coils 24 of a normally extended tension spring. The fusible and strain wires 20 and 22, together with a part of terminal portion 18 of the clamp, are adapted to be positioned within a tube 46 of insulating material, preferably a material which is capable of evolving an arc-extinguishing gas when in proximity to an electric arc, such for example as fiber or a synthetic resin. The upper end of tube 46 is provided with a cap 48 suitably secured to the tube, for example as by the indented portion 50, and cap 48 is secured to terminal 18 of the clamp, for example as by soldering or the like. The tension spring is provided with an intermediate portion 26 having coils larger than end coils 24, and coils 24 and 26 of the spring are adapted to be positioned within tube 46 with the outer end of the spring provided with larger coils 28 adapted to engage the lower end of tube 46. In addition to wires 20 and 22 being hooked over the small coils 24 of the spring, flexible tail 6 of the fuse has its end also positioned within the coils of spring portion 24, and these are then filled with solder to securely anchor tail 6 and wires 20 and 22 to the upper end of the tension spring. The purpose of the tension spring is to rapidly move tail 6 of the fuse downwardly and away from tube 46 when fusible element 20 and strain wire 22 melt.

The fuse comprising clamp 2, fuse 4 and tail 6, comprises a replaceable unit which may be readily attached to a line conductor 32 when carrying current by lifting the unit with a hook stick or the like inserted in hook-eye 8, onto conductor 32, and then placing the hook stick in hook-eye 16 and pulling downwardly so that the conductor will enter clamp portion 10 of clamp 2 to be securely frictionally held by the clamp. Tail 6 of the fuse is made sufficiently long so that it may be cut to the size necessary for connection to the terminal of the adjacent electrical apparatus which it is desired to protect.

The mounting illustrated in Fig. 1 comprises a pole 30 carrying line conductor 32 on a pole top insulator 34 to which the line conductor is secured as by means of a tie-wire 36. A transformer 40 is mounted on the pole in any desired manner, for example as by brackets 42. The pole may also carry a neutral conductor 38 at one side thereof. Transformer 40 is provided with a bushing for a high-tension terminal 44 to which the tail 6 of a fuse constructed in accordance with this invention is adapted to be connected in the first step of connecting the transformer to the high-tension conductor 32. The fuse may then be lifted on to conductor 32 and then drawn down into clamping engagement therewith in the manner described above.

In response to the flow of currents in the circuit above a predetermined value, fuse element 20 will melt in the usual way and strain wire 22 will likewise be immediately consumed so that the tension spring within tube 46 will be free to withdraw tail 6 from the tube assisted, of course, by the expulsion action of gases developed within the tube, and by gravity. Blowing of the fuse thus results in protecting the transformer by disconnecting it from its high-tension source of electrical energy and, in addition, provides an air gap in the circuit between clamp 2 and transformer terminal 44. After the fuse is blown, clamp 2 may be removed from conductor 32 by inserting a hook stick in hook-eye 8 to move the clamp upwardly and off line conductor 32. Clamp 2 may then be discarded, together with the remains of tail 6, and a new fuse unit comprising clamp 2, fuse 4 and tail 6 be inserted in place in the manner described.

From the foregoing, it is apparent that the fuse unit described herein provides, in combination, a hot line clamp, a non-renewable expulsion fuse element and a flexible conductor for attachment to a suitable terminal. Such a fuse has the obvious advantage that being constructed of few parts, it is extremely cheap and simple to build, as well as being simple to install and operate, and yet meets the necessary requirements of positive air gap isolation of the circuit from the faulted transformer or circuit protected thereby, together with providing a suitable indication of operation. In addition, this fuse possesses the further advantage that it does not require additional insulation to be placed in the distribution circuit, with the attendant increase in possibility of failure of such insulation. The fuse employs only the insulation which is necessary for the distribution circuit itself, and, therefore, has no tendency to reduce the insulation level of the line.

Having described a preferred embodiment of the invention in accordance with the patent statutes, it is desired that the invention be not limited to this particular embodiment, inasmuch as it will be obvious, particularly to persons skilled in the art, that many changes and modifications may be made in this specific structure without departing from the broad spirit and scope of this invention. Accordingly, it is desired that the invention be interpreted as broadly as possible, and that it be limited only as required by the prior art.

I claim as my invention:

1. A fuse comprising, a line clamp formed of resilient strip material bent at the upper end of the clamp to form a downwardly opening outwardly flared line conductor receiving and clamping portion, said strip material bent intermediate its ends to form a hook-eye located intermediate the ends of the clamp and which is closed at least on its lower side so that a hook-stick may be inserted in said hook-eye to pull said clamp downwardly onto a line conductor, the other end of said strip material at the other end of the clamp having fusible means directly and permanently secured to an integral part thereof, and a flexible terminal conductor supported solely by said fusible means.

2. A fuse renewable in its entirety, comprising, a line clamp, fusible means having a direct permanent connection with an integral part of said clamp, and flexible conducting means directly and permanently secured to said fusible means, so that said clamp part and conducting means comprise terminals for the arc formed upon fusion of said fusible means.

3. A fuse comprising, a line clamp, a flexible terminal conductor, fusible means connected between said clamp and conductor by direct and permanent connections with an integral part of said clamp and said conductor, respectively, said clamp including a downwardly opening spring clamp portion for engaging a line conductor, a hook-eye above said clamp portion, and a hook-eye located intermediate said clamp portion and said fusible means, said hook-eye located below said clamping portion being closed at least on its lower side so that a hook-stick may be inserted therein to pull said clamp downwardly onto a conductor.

JAMES M. WALLACE.

REFERENCES CITED

The following references are of record in the file of this patent:

UNITED STATES PATENTS

| Number | Name | Date |
|---|---|---|
| 1,663,252 | Herbrick | Mar. 20, 1928 |
| 1,822,883 | Chandler | Sept. 15, 1931 |
| 2,198,841 | Pittman et al. | Apr. 30, 1940 |
| 2,270,225 | Steinmayer | Jan. 13, 1942 |
| 2,288,680 | Chandler | July 7, 1942 |
| 2,297,036 | Tallman | Sept. 29, 1942 |
| 2,328,177 | Steinmayer | Aug. 31, 1943 |

FOREIGN PATENTS

| Number | Country | Date |
|---|---|---|
| 358,944 | Great Britain | Oct. 15, 1931 |